E. W. CLARK.
COMPOSITE PISTON.
APPLICATION FILED NOV. 18, 1915.
1,221,419.    Patented Apr. 3, 1917.
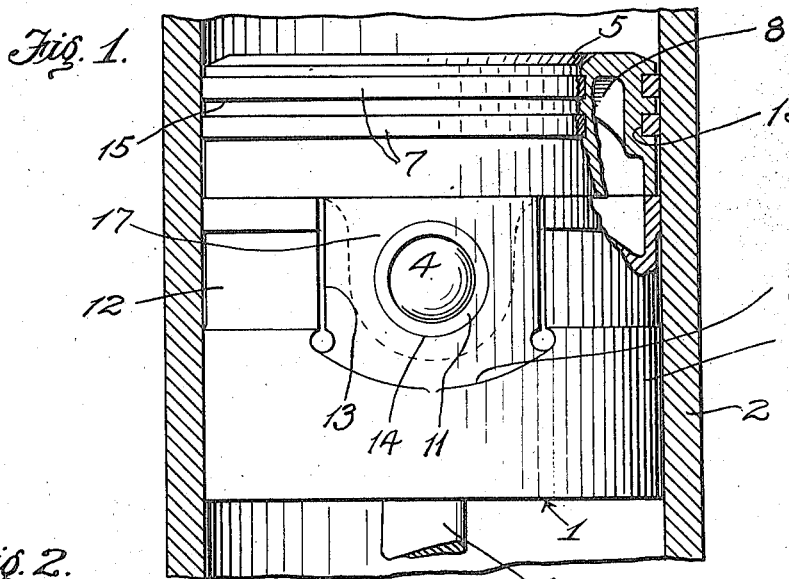
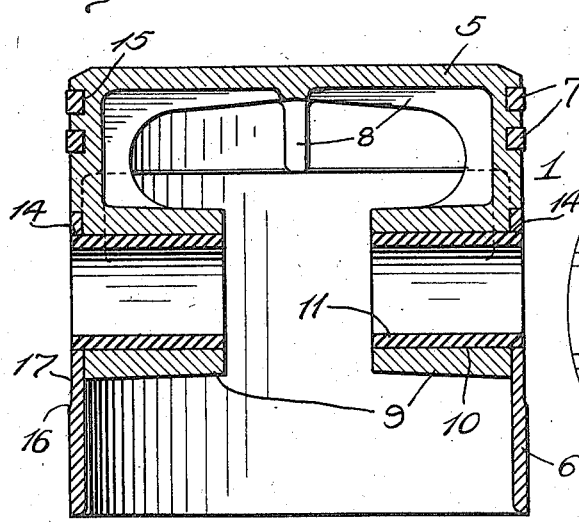
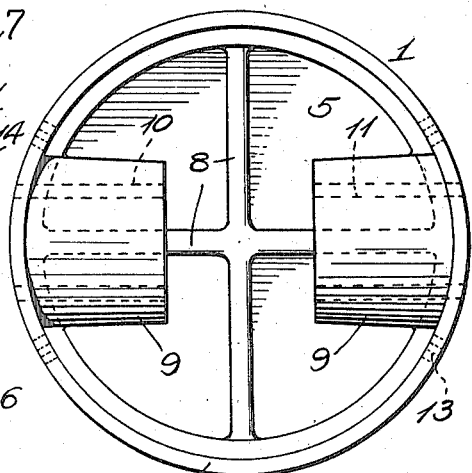
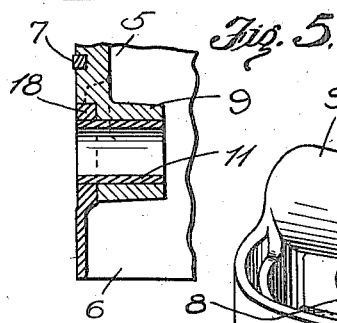
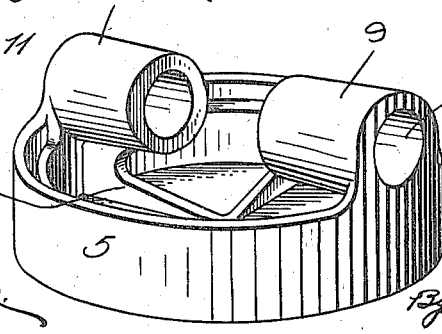
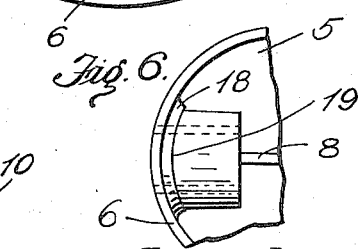
Inventor.
Edward W. Clark.

UNITED STATES PATENT OFFICE.

EDWARD W. CLARK, OF LOS ANGELES, CALIFORNIA, ASSIGNOR OF ONE-HALF TO ALVIN WELLS, OF LOS ANGELES, CALIFORNIA.

COMPOSITE PISTON.

1,221,419.  Specification of Letters Patent.  Patented Apr. 3, 1917.

Application filed November 18, 1915. Serial No. 62,137.

*To all whom it may concern:*

Be it known that I, EDWARD W. CLARK, a citizen of the United States, residing at Los Angeles, in the county of Los Angeles and State of California, have invented certain new and useful Improvements in Composite Pistons, of which the following is a specification.

This invention relates to improvements in pistons, and is applicable to pistons adapted for various uses, as in engines or pumping mechanism of various kinds.

It is an object of the invention to provide a composite piston, whereby it may be greatly lightened in weight, and yet may be provided with the necessary hard wearing surfaces at the points where the wear comes in the movement and use of the pistons.

It is also an object of the invention to provide a two part piston having a connecting means for joining them, said connecting means also becoming a part of the piston.

It is a further object of the invention to provide a piston with a head portion of material of comparatively light weight, and to provide a wearing skirt portion, the two parts being held together by bearing members or bushings.

With these and other objects in view the invention comprises certain novel constructions, combinations and arrangements of parts as will be hereinafter more fully described and claimed. In the accompanying drawing:

Figure 1 is a side elevation of a piston, a portion of a cylinder inclosing the same being shown in longitudinal section.

Fig. 2 is a longitudinal cross section taken through said piston in line with the bushings thereof.

Fig. 3 is a bottom plan view of the complete piston.

Fig. 4 is a perspective view of the said head portion.

Fig. 5 is a fragmentary detail sectional view through one of the bushings of the wrist pin and the adjacent parts of the piston, to show the thickening of the skirt walls.

Fig. 6 is a detail bottom plan view of a portion of the said piston when the skirt portion is thickened or provided with bosses opposite the bosses on the head portion.

The piston of the present invention is designed with a view of greatly reducing the weight which has been carried by piston moving mechanisms heretofore. The average engine piston is necessarily quite heavy as generally made, because, if it is formed of iron or steel, of the amount of metal required for producing a strong head and skirt portion, together with an ample thickness of metal around the bearings or bushings a considerable amount of said metal must be used. In rapid moving engines especially is it desirable to have the pistons as light in weight as possible, for in reciprocating pistons the weight of the said pistons must be stopped and started again at every reciprocation. This brings additional wear upon the bearings and strain upon the shaft. The piston of the present invention is so constructed that materials of different kinds may be employed therein, the one which does not have to receive the wear in the cylinder, being made of very much lighter material than the remainder of the piston. A preferred form of piston has been illustrated in the drawing and the details and features of the invention will now be more fully described reference being had thereto.

In the said drawing 1 indicates a piston, 2 a cylinder receiving the same while 3 indicates a connecting rod or pitman of the usual type and 4 a wrist pin for connecting the said rod 3 with the piston. The type of piston shown is such as is commonly employed in gas or other engines. The body portion of the piston is composed of two parts, the head 5 and the skirt 6. These parts of the piston are preferably made in integral pieces and are connected to form a composite piston as hereinafter described. The head portion 5 need have no other bearing within the cylinder 2, than that had through the piston packing rings 7 which it carries. The said head 5 may therefore be made of light material, as for instance aluminum or any other metal which is lighter than the iron or steel of which the pistons are generally made. The said head is therefore also preferably cast in a single piece as clearly shown in Fig. 4. The casting, preferably of aluminum, is made hollow and preferably provided with strengthening ribs 8 extending across the closed end portion of the said head as clearly shown in Figs. 2, 3 and 4. Enlarged portions or bosses 9 are also preferably cast integral with the said head and are provided with central openings or bores 10 adapted to receive the bushings 11 which engage the wrist pin 4. The head as cast is usually in the form disclosed in Fig. 4 of the drawing; the outer ends of the bosses 9 are turned down so as to receive the portion of the skirt which slips over the bushing openings as will be clearly understood by reference to Figs. 2 and 3 of the drawing. A continuous circular edge portion is thus offered by the head to the inner edge of the skirt 6. The said skirt 6 is preferably made of a material of proper hardness to afford the necessary wearing surface for a piston which is to operate in a cylinder of any kind. The said sleeve is usually made of cast iron and its outer surface is trued to fit accurately into the cylinder into which it is to move. The central or waist portion of the piston may be provided with a distributing way or groove 12 if desired. The skirt portion of the piston being usually of cast iron in which there is a very slight degree of expansion and contraction due to changes of temperature, may be turned to fit very closely within the cylinder, being only a fraction less in diameter than the bore of said cylinder. Any tendency to a slight inclination of the piston to the walls of said bore are thus prevented and the trouble due to what may be termed side slap, which is usually had where the diameter of the piston is considerably reduced over that of the diameter of the cylinder bore, is entirely prevented. The head portion 5 of the piston is however, made of less diameter exteriorly than the diameter of the skirt 6, because it is made of softer material such as aluminum or its alloys, in which there is a much larger degree of expansion due to heat. The said head portion is thus not of sufficient diameter to touch and engage the inner surface of the cylinders and has merely an edge to edge contact with the skirt 6, whereby unequal expansion and contraction in the materials of the parts will not be interfered with. The packing rings 7 and the skirt 6 are the only parts which engage the inner surface of the cylinder. Opposite the bosses 9 of the head portion 5 it is necessary however to make further provision for the said expansion and contraction of the materials. The skirt 6 must fit closely upon the outer end surfaces of the said bosses and for this reason the said bosses are only turned down sufficiently to permit the skirt to slip in place thereon. In order to prevent any possibility of trouble due to the expansion of the thick boss portions of the head, the skirt is preferably provided with slots or kerfs 13 in its upper edge and arranged upon opposite sides of the said bosses 9 as clearly shown in Fig. 1 of the drawing. The portion of the skirt 17 between the said kerfs and extending a little below the inner ends thereof as shown by the line at 16, is ground upon its outer surface so as to be depressed a fraction of an inch below the remainder of the exterior surface of the skirt 6. The greater expansion of the softer material in the head than that of the skirt will thus be permitted to force the reduced wall portion 17 outwardly without danger of making the pistons stick in the cylinders. The skirt 6 is also provided with apertures 14 formed in alinement with the bores 10 in the bosses 9 of the head. The sleeves forming the bushings are fitted into the said bores 10 and extend through the apertures 14 whereby the parts of the piston are firmly secured and locked together. The composite piston is thus made in effect the same as if it were cast in a single piece.

The skirt portion 6 may or may not be provided with packing rings as preferred. Preferably it is not so provided, the only packing rings needed, being thus carried by the head 5. The said packing rings 7 may be of any usual or ordinary construction and the head is provided with annular grooves or recesses 15 to receive the same. Two packing rings have been shown in the drawing but it will be readily understood that a greater or lesser number may be used as found desirable. While the walls of the skirt portion 6 may be made of substantially the same thickness throughout, it is sometimes preferable to thicken the said walls at 18 around the openings 14 which receive the ends of the bushings 11, as clearly shown in Fig. 5 of the drawing. In this instance the bosses are cut back more at their outer ends as shown at 19 in Fig. 6 to receive the said thickened portions 18 of the skirt. In either event it is important that the bushings engage apertures in the skirt, for the material of the skirt being hard will not yield or the apertures become larger under the pounding action to which the piston and wrist pin may be subjected. If the wrist pin engaged the lighter material only, there would be danger of the bearings therein becoming larger or stretching in the direction of the movement of the pitman or connecting rod 3, after which repeated pounding would rapidly enlarge the openings and render the parts very loose. When the skirt is made of cast iron and the bushings extend through holes therein as shown this is practicably impossible.

It will be evident that a piston of this kind may be made of very much less weight than the pistons now in common use, especially in that the head portion which, with the bosses 9 thereon, comprise the bulk of the metal necessary in forming the piston is made of such light material as aluminum or alloys thereof. It will be observed that no wear comes upon the aluminum head as it is made of a little less diameter than the skirt, and that the thin walled light skirt 6 receives all of the wear due to the movement of the piston in the cylinder, the packing rings 7 preventing leakage past the piston in said cylinder. It will be understood that the piston above described my be employed in all kinds of engines and in pumps of various types or any other place where a plunger or reciprocating member is desired which is movable within a cylinder by a crank, eccentric or other means all within the spirit and scope of the present invention.

What is claimed is:

1. A two part piston having a body portion of light material and a wearing cylinder-engaging portion of a larger diameter and of heavier material abutting thereon whereby the unequal expansion and contraction of the different materials employed will not be interfered with and means holding them fixed with respect to each other.

2. A composite piston made up of different materials of different hardness, the softer material being of less diameter than the harder, whereby the latter only will receive the wear and connecting members holding the said materials together.

3. A composite piston made up of materials of different specific gravity and a bearing member for rigidly holding them with respect to each other as a single piston without preventing expansion and contraction when hot and cold.

4. A composite piston comprising an integral head of comparatively light material and a wearing skirt portion of heavier material and bushings for connecting the same.

5. A composite piston having a head portion and bearing receiving bosses formed in an integral piece, a wearing skirt fitted thereon and wrist pin bushings inserted in said bosses and extending through the walls of said skirt for locking the piston parts together.

6. A piston having an aluminum head and an iron skirt portion and bushings of bearing material connecting the said head and skirt.

7. A piston having a head provided with piston ring grooves, piston rings mounted therein, a skirt portion having its inner edge abutting upon the inner edge of said head, whereby they may contract and expand unevenly with respect to each other, and bearing members connecting the said parts.

8. A piston having a head portion with inturned edges, a skirt having its inner edge fitted upon said edge portion, and provided with kerfs extending inwardly therefrom, whereby the unequal expansion and contraction of the parts of the piston may be accommodated and bearing members connecting the parts of the piston together.

9. A piston having a head portion with bosses formed thereon adapted to receive a wrist pin, a skirt portion having parts of its walls reduced in its outer diameter opposite and adjacent the said bosses whereby the greater expansion of the metal of the bosses may be accommodated by these portions of the skirt walls.

10. A composite piston having a head of one material and provided with wrist pin receiving bosses, a skirt of another material having kerfs formed therein upon each side of the wall portions which engage said bosses, the outer surface of the portions between said kerfs being ground to a less thickness than the rest of the skirt, the structure being such that a greater expansion of the material in the bosses will be accommodated by the thin portions of the skirt without danger of the sticking of the piston in its cylinder.

11. A composite piston comprising a head portion having wrist pin receiving bosses, a skirt portion fitting thereon and having apertured portions applied upon the said bosses, the said apertured portions being thickened around the aperture for offering a greater bearing to the wrist pin and preventing the distortion of the portions of the wrist pin bearings within the bosses.

In testimony whereof, I have hereunto set my hand, in presence of two witnesses.

EDWARD W. CLARK.

Witnesses:
CASSELL SEVERANCE,
EARLE R. POLLARD.